United States Patent
Watson

(10) Patent No.: US 7,093,679 B1
(45) Date of Patent: Aug. 22, 2006

(54) FOUNDATION DRILLING APPARATUS AND METHOD WITH CONTINUOUSLY VARIABLE HYDRAULIC DIFFERENTIAL ROTARY TABLE

(75) Inventor: Douglas A. Watson, Fort Worth, TX (US)

(73) Assignee: Watson Incorporated, Fort Worth, TX (US)

(*) Notice: Subject to any disclaimer, the term of this patent is extended or adjusted under 35 U.S.C. 154(b) by 193 days.

(21) Appl. No.: 10/859,808

(22) Filed: Jun. 3, 2004

Related U.S. Application Data

(60) Provisional application No. 60/476,046, filed on Jun. 5, 2003.

(51) Int. Cl.
*E21B 3/02* (2006.01)
*F16H 47/02* (2006.01)

(52) U.S. Cl. .................... 175/170; 175/189; 173/176; 173/178; 475/75

(58) Field of Classification Search ............. 175/170, 175/189; 173/176, 178, 145, 154, 160; 475/75, 475/72, 79
See application file for complete search history.

(56) References Cited

U.S. PATENT DOCUMENTS

| | | | |
|---|---|---|---|
| 3,669,199 A * | 6/1972 | Cullen et al. ............... | 175/106 |
| 3,705,603 A * | 12/1972 | Hawk .................... | 137/624.14 |
| 3,748,924 A | 7/1973 | Cross et al. | |
| 4,848,186 A | 7/1989 | Dorgan et al. | |
| 4,877,091 A | 10/1989 | Howell, Jr. | |
| 5,512,021 A | 4/1996 | Shash | |
| 5,709,628 A * | 1/1998 | Pidde et al. .................. | 475/75 |
| 5,960,886 A * | 10/1999 | Morrow ..................... | 166/369 |
| 6,079,906 A | 6/2000 | Herrero Codina | |
| 6,387,004 B1 | 5/2002 | Parrish | |
| 6,387,005 B1 | 5/2002 | Matsuyama et al. | |

* cited by examiner

*Primary Examiner*—Frank Tsay
(74) *Attorney, Agent, or Firm*—Geoffrey A. Mantooth

(57) ABSTRACT

A drilling machine drills foundation holes known as drilled shafts or bored piles with a drilling tool attached to an end of a kelly. The kelly is rotated with a rotary drive. The rotary drive has a first motor, a final drive gear coupled to the kelly so as to rotate with the kelly and a planetary gear set between the first motor and the final drive gear. A second motor is coupled to the ring gear on the planetary gear set. A clutch can also be connected to the ring gear. The rotary drive allows the drilling tool to be rotated at low drilling speeds and, without stopping rotation or shifting gears, removed from the hole and accelerated to high speeds to discharge spoil. A mid-range is also possible, wherein the drilling tool can process fluids in the hole. Another motor and planetary gear set can be coupled to the final drive gear and to the second motor.

10 Claims, 5 Drawing Sheets

FOUNDATION DRILLING APPARATUS AND METHOD WITH CONTINUOUSLY VARIABLE HYDRAULIC DIFFERENTIAL ROTARY TABLE

This application is a continuation-in-part of U.S. application Ser. No. 60/476,046, filed Jun. 5, 2003.

FIELD OF THE INVENTION

The present invention relates to rotary drives and methods for drilling and in particular to foundation or pier drilling.

BACKGROUND OF THE INVENTION

Foundation or pier drilling machines (also known in the industry as bored piling machines) are used to drill holes for the foundations of structures, such as buildings and bridges. The holes drilled may be, for example, up to 12 feet in diameter and up to an average of 120 feet deep. Once the hole is drilled, concrete is poured in to form a pier or footing.

The drilling tool of choice is an auger bit. The auger has helical, spiraling flanges or flights.

In typical drilling operations with an auger bit, the auger is placed onto the desired location in the ground and then rotated. Rotation of the auger occurs by rotating a kelly bar that is inserted into the auger. The kelly is coupled to a stationary mast by way of a rotary drive. The rotary drive rotates the kelly and allows the kelly to move vertically up and down.

In any drilling operation, the process of drilling creates spoil, or cuttings, that must be removed from the hole. In some drilling operations, fluid is circulated in and out to carry the spoil out of the hole. However, in many foundation or pier drilling operations, the spoil is simply lifted out of the hole by way of the auger bit.

The spoil collects on the flights of the auger during drilling. To remove the spoil, the auger is lifted out of the hole and swung over to one side of the hole. The auger bit is rotated and is in fact accelerated to a higher speed than normal drilling speed. This acceleration and high rotational speed flings or discharges the spoil from the flights of the auger.

In the prior art, drilling machines have had difficulty in transitioning the auger bit from drilling speeds to the higher spoil discharge speeds. When drilling, the operator rotates the auger bit at drilling speeds, which speeds are relatively low, using one set of drive gears. This arrangement allows the bit to be turned with high torques. To discharge spoil from the bit, the operator withdraws the bit from the hole and stops rotating the auger bit in order to engage another set of drive gears. This other set of drive gears rotates the bit at high speeds and low torques. Unfortunately, without high torque, bringing the bit, loaded with spoil, from zero to high speeds is time consuming and sometimes ineffective. It is analogous to a car completely stopping and then trying to move forward in a high ($4^{th}$ or $5^{th}$) gear. The bit initially rotates very slowly and gradually picks up speed. The slow spin-up time and acceleration of the spoil-laden auger bit adds delay and loss of productivity to overall drilling operations. The required stopping and/or shifting, if not done with careful operator control, is also a potential cause of damage to the prior art rotary drives.

SUMMARY OF THE INVENTION

It is an object of the present invention to provide a rotary drive for a drilling machine that allows transition from high torque at low drilling speeds to high discharge speeds without the need to stop rotation of the drilling tool or shift gears within the drive train.

It is another object of the present invention to provide a rotary drive for a drilling machine that allows the drilling tool to be rotated at a mid-range of speed at full system power so as to allow for the processing of fluids in the hole, as well as other applications.

The present invention provides a drilling machine for use in drilling foundation holes. The drilling machine comprises a kelly having one end that is structured and arranged to couple to a drilling tool. The kelly has a rotary drive that comprises a first motor mounted to a frame. A final drive gear is rotatably coupled to the kelly. A planetary gear set has a sun gear and at least one planet gear. The first motor is connected to one of the sun gear or the at least one planet gear. The final drive gear is connected to the other of the sun gear or the at least one planet gear. The planetary gear set has a ring gear around the at least one planet gear. The ring gear is rotatable with respect to the frame. A second motor is mounted to the frame. The second motor is coupled to the ring gear so as to selectively rotate the ring gear.

In accordance with one aspect of the present invention, the first and second motors are hydraulic motors.

In accordance with another aspect of the present invention, the drilling machine further comprises a releasable clutch coupled to the ring gear.

In accordance with another aspect of the present invention, the planetary gear set is a two-stage planetary gear set.

In accordance with still another aspect of the present invention, the planetary gear set is a first planetary gear set. The drilling machine further comprises a third motor mounted to the frame and a second planetary gear set having a sun gear and at least one planet gear. The third motor is connected to one of the sun gear or the at least one planet gear. The final drive gear is connected to the other of the sun gear or the at least one planet gear. The second planetary gear set has a ring gear around the at least one planet gear. The ring gear is rotatable with respect to the frame. The second motor is coupled to the ring gear of the second planetary gear set. The ring gears of the first and second planetary gear sets rotate together.

In accordance with another aspect of the present invention, the drilling machine further comprises a releasable clutch coupled to the ring gears of the first and second planetary gears.

In accordance with another aspect of the present invention, the rotary drive can traverse along at least a portion of a mast.

The present invention also provides a method of drilling a foundation hole. A kelly is provided with a drilling tool at one end of the kelly. With the drilling tool in contact with the ground, the kelly is rotated at a first speed and a first torque so as to drill a hole. Without stopping the rotation of the kelly, the kelly is lifted so as to bring the drilling tool out of contact with the ground and the kelly is rotated up to a second speed and second torque level that is capable of utilizing the full system power. The second speed is greater than the first speed so as to discharge spoil from the drilling tool.

In accordance with another aspect of the present invention, the kelly is rotated at a third speed and torque level that is capable of utilizing the full system power, with the third speed being greater than the first speed and less than the first speed. Fluids in the hole being drilled are processed with a rotary drilling tool.

In accordance with another aspect of the present invention, the step of rotating the kelly at a second speed and a second torque further comprises the step of changing from the first speed and first torque to the second speed and second torque by changing along a range of speeds and torques at full power.

DESCRIPTION OF THE PREFERRED EMBODIMENT

Figure 1:
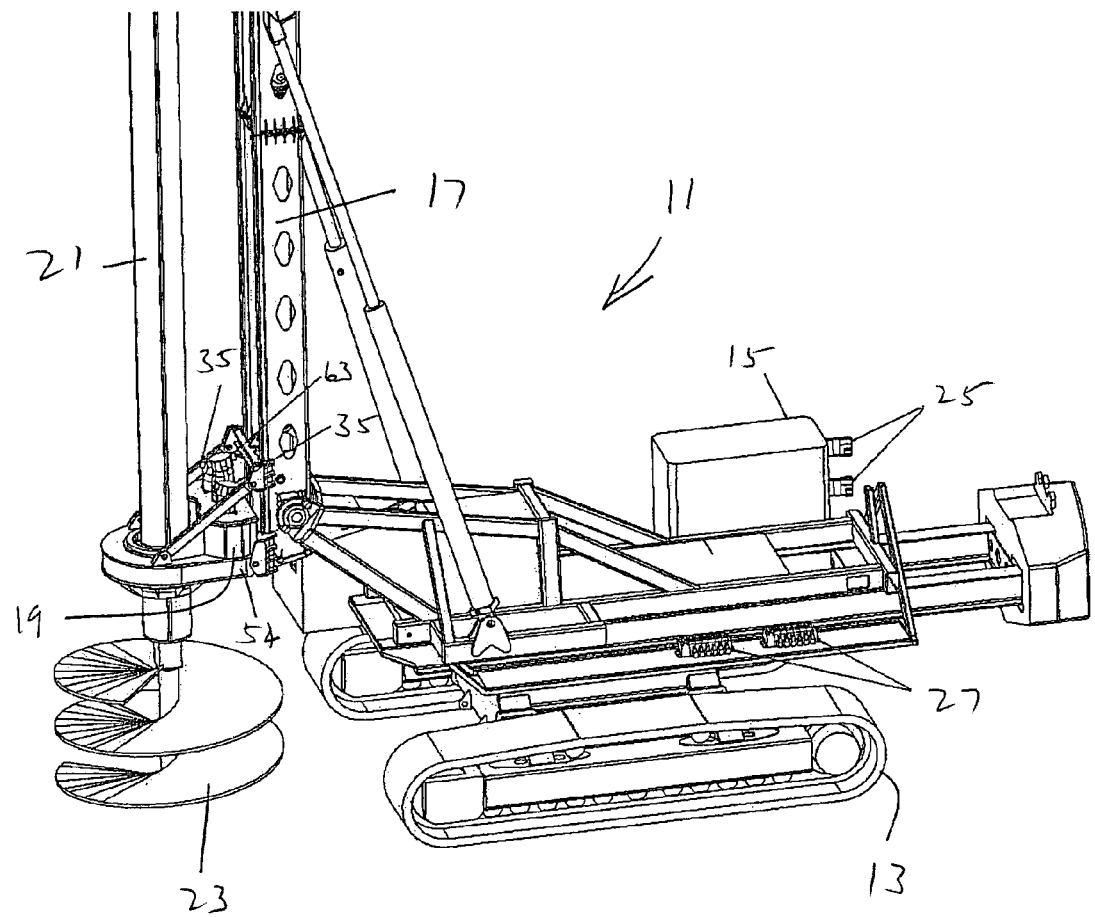
FIG. 1 is a view of a drilling machine, with the rotary drive of the present invention, in accordance with a preferred embodiment.

In FIG. 1, there is shown a drilling machine 11. The machine 11 is a self-propelled vehicle, being mounted on tracks 13 and having an engine 15. The engine 15 provides mechanical power to both propel the vehicle and conduct drilling operations. The drilling machine is used in drilled haft (bored pile) applications primarily used in the foundation industry.

At one end of the vehicle is a mast 17 that can be raised and lowered between a horizontal (stowed) position and a vertical (operational) position. Mounted to the mast 17 is a rotary drive 19. The rotary drive 19 can traverse along a portion of the length of the mast 17. The mast 17 has tracks and the rotary drive has guides that move along the tracks. Alternatively, the rotary drive can be fixed to the mast. The rotary drive 19 receives a kelly bar 21. Mounted to the bottom of the kelly 21 is a drilling tool, such as an auger 23. Other types of drilling tools can be used, such as core barrels, under reamers and drill buckets.

The engine 15 powers hydraulic pumps 25, which pumps provide hydraulic fluid to components of the rotary drive 19. This is shown schematically in FIG. 3. The pumps 25 are in turn connected to hydraulic proportioning valves, contained in valve banks 27. Hydraulic lines 29 extend between the valve banks 27 and the rotary drive 19.

Figure 2:
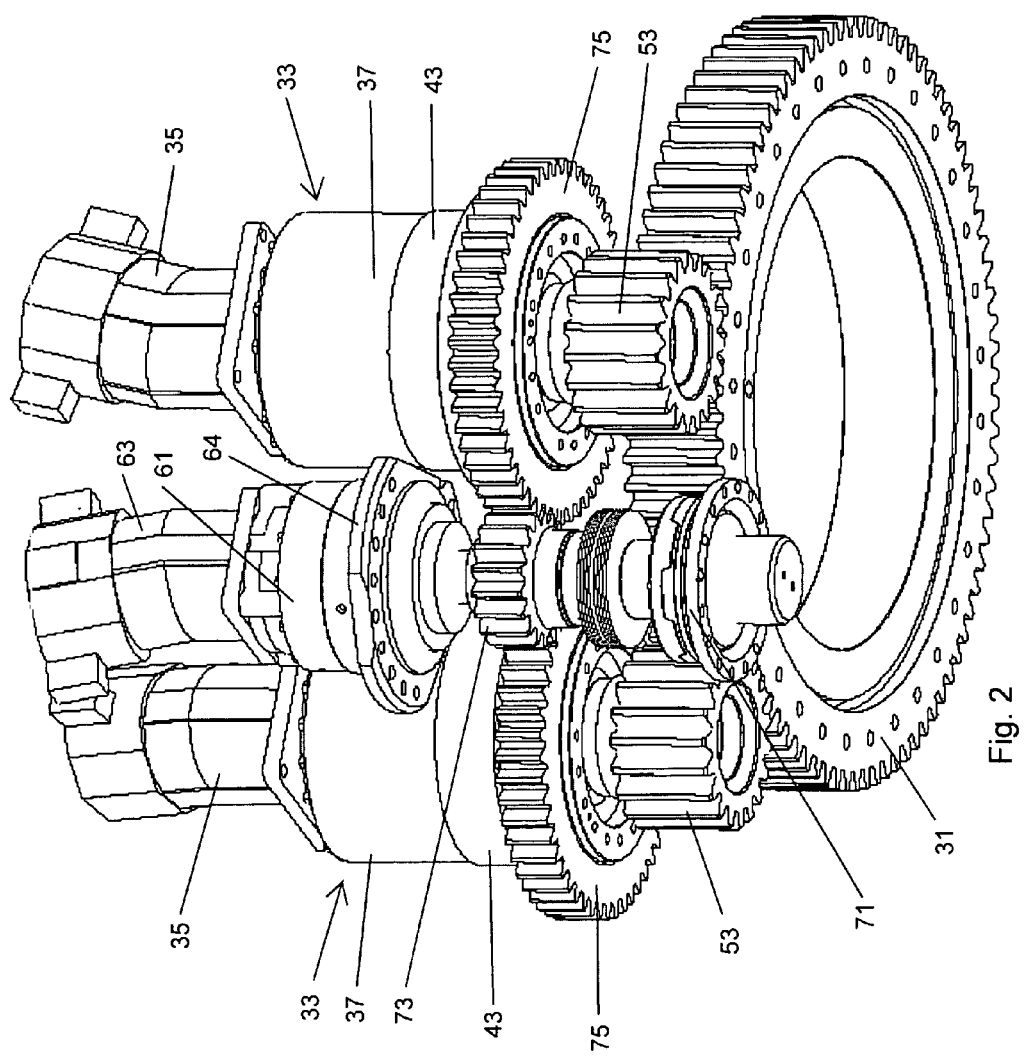
FIG. 2 is a view of the rotary drive, shown from the underside and without a cover or frame.

As shown in FIG. 2, the rotary drive has a large spur gear 31, or final drive gear. This is the output of the rotary drive 19 and is connected to a spindle (not shown). The sleeve-like spindle in turn receives the kelly 21. The spindle and kelly have cooperating drive surfaces so that rotation of the spindle causes rotation of the kelly, and thus rotation of the drill bit 23.

The final drive gear 31 is rotated by one or more primary drive units 33. Each primary drive unit 33 has a hydraulic primary drive motor 35. In the preferred embodiment, the motors are variable displacement hydraulic motors. Interposed between the primary drive motors 35 and the final drive gear 31 are planetary gearboxes 37 and pinion gears 53 that provide speed reduction.

Figure 3:
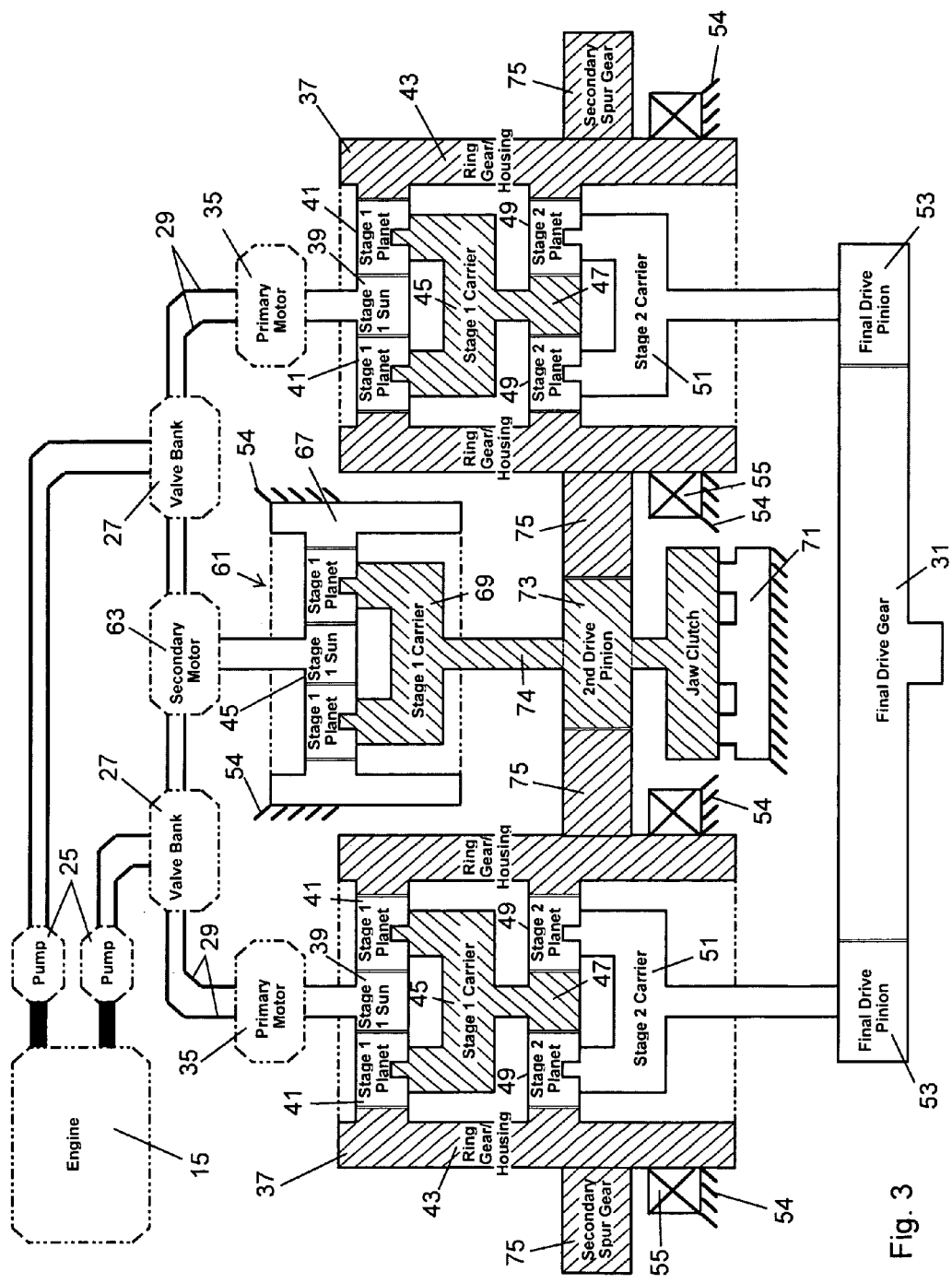
FIG. 3 is schematic view of the rotary drive and the hydraulic system.

FIG. 3 schematically shows the arrangement of FIG. 2 as well as the hydraulic system. Each primary drive motor 35 has an output that is connected to a sun gear 39 in the respective planetary gearbox 37. The planetary gearboxes 37 are two stage, so that the sun gear 39 is the first stage sun gear. First stage planetary gears 41 revolve around the first stage sun gear 39 inside of each planetary gearbox. The planetary gears rotate in a ring gear on the inside of the gearbox housings 43. A first stage carrier 45 is connected as an output to the first stage planetary gears 41 and is also located within the respective housing 43. The first stage carrier 45 has an output end that forms the second stage sun gear 47. Second stage planetary gears 49 revolve around the second stage sun gear 47 in the inside of the housing 43. A second stage carrier 51 is connected to the second stage planetary gears 49. The output of the second stage carrier 51 is connected to a final drive pinion gear 53 which in turn is coupled to the final drive gear 31.

The housing 43 of each planetary gearbox is mounted to a frame 54 by way of a bearing 55. The frame 54 is for the rotary drive and is fixed relative to the mast 17, except that the frame can move along most of the length of the mast. Thus, the housing 43 of each planetary gearbox can move with respect to the frame 54 and the mast 17.

An auxiliary, or secondary unit 61, is provided to control the rotation of each housing 43 of each primary drive unit planetary gearbox 37. The secondary unit 61 has a secondary hydraulic motor 63, the output of which is connected to a sun gear 65 of the planetary gearbox 61. The planetary gearbox 61 in the secondary unit is similar to the planetary gearboxes 37 of the primary units 33 except that the planetary gearbox 61 of the secondary unit is a single stage gearbox. Furthermore, the housing 67 of the secondary unit planetary gearbox 61 is fixed to the frame 54 so as prevent rotation. The gear box 61 is fixed to the frame by a flange 64 (see FIG. 2). The output of the carrier 69 of the second unit planetary gearbox is connected to a secondary pinion gear 73. The pinion gear 73 is connected to a jaw style clutch 71, which clutch is coupled to the frame 54. When engaged, the clutch 71 prevents the rotation of the pinion gear 73. When the clutch 71 is disengaged, the pinion 73 is allowed to turn under the action of the secondary pinion output shaft 74. The clutch 71 is engaged by spring loading and disengaged by hydraulically applied force. The secondary pinion gear 73 couples to secondary external gears 75, connected to each of the housings 43 of the primary unit planetary gearboxes. The secondary external gears 75 rotate in unison with the respective housings 43 of the planetary gearboxes 37.

Figure 4:
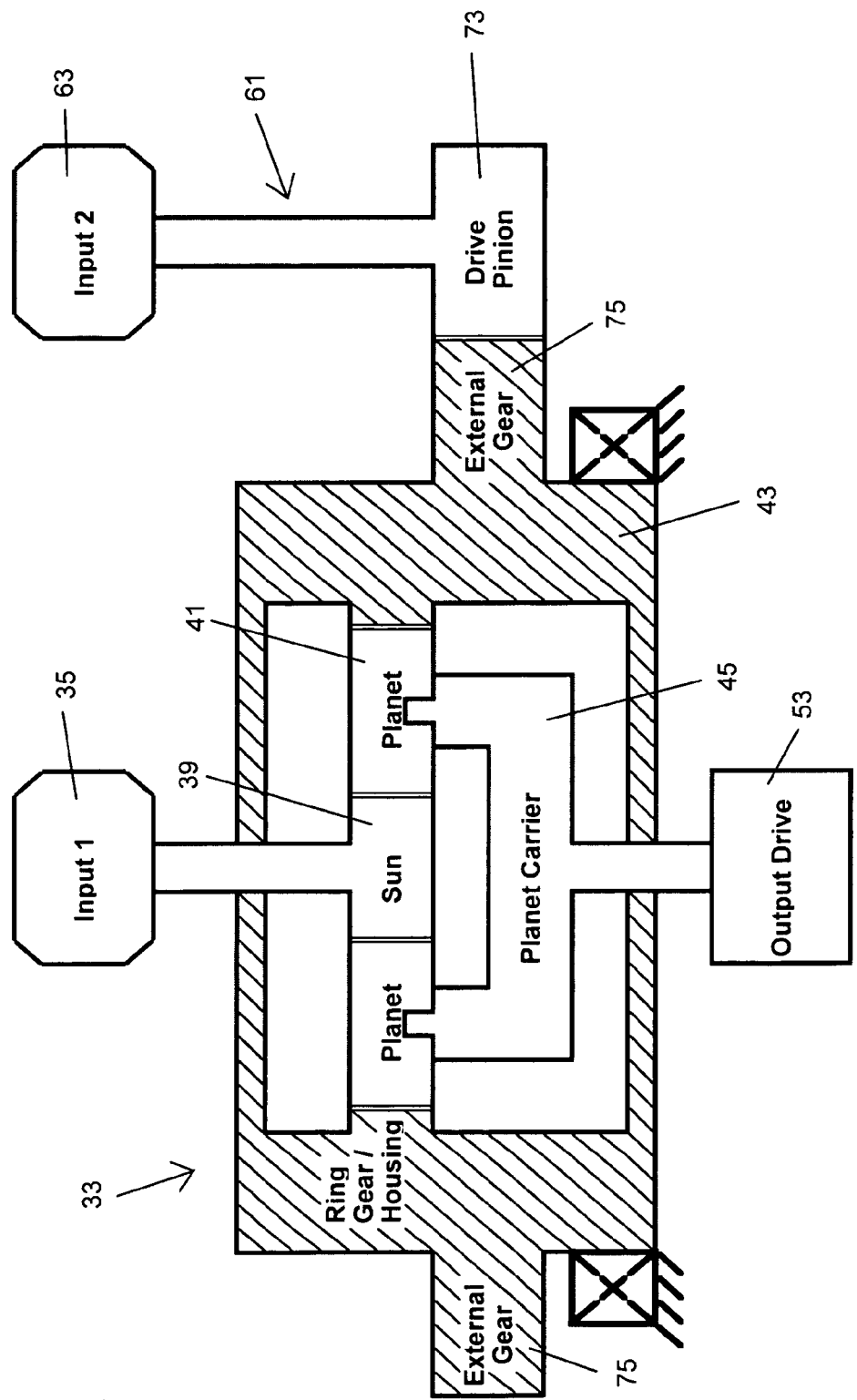
FIG. 4 is a schematic view of a rotary drive, in accordance with another embodiment.

In the preferred embodiment, there are provided two primary units 33 in order to achieve the desired torques. The rotary drive can be provided with a single primary drive unit, or with more than two primary drive units, depending on the particular application. FIG. 4 illustrates a rotary drive with a single primary unit 33. The secondary unit 63 in FIG. 4 does not have a planetary gearbox. Also, in the preferred embodiment, the planetary gearbox in the primary drive units are two stage gearboxes and the planetary gearbox in the secondary unit is a single stage gearbox. The number of stages in the planetary gearboxes can vary depending upon the particular application. (The planetary gearbox in FIG. 4 is a single stage.) Furthermore, the present invention utilizes a jaw in the secondary unit in order to hold stationary the housings 43 of the primary unit planetary gearboxes 37. As an alternative to the clutch, a brake, such as a multi-disc, spring applied, hydraulically released brake, or a self-locking gear set such as worm gearing, can be used. The high torques involved make the use of a brake, clutch or locking gearset desirable. For other applications and torques, such locking mechanisms may not be required, as the secondary unit 61 may be able to hold the primary unit housings 43 stationary (see FIG. 4).

Figure 5:
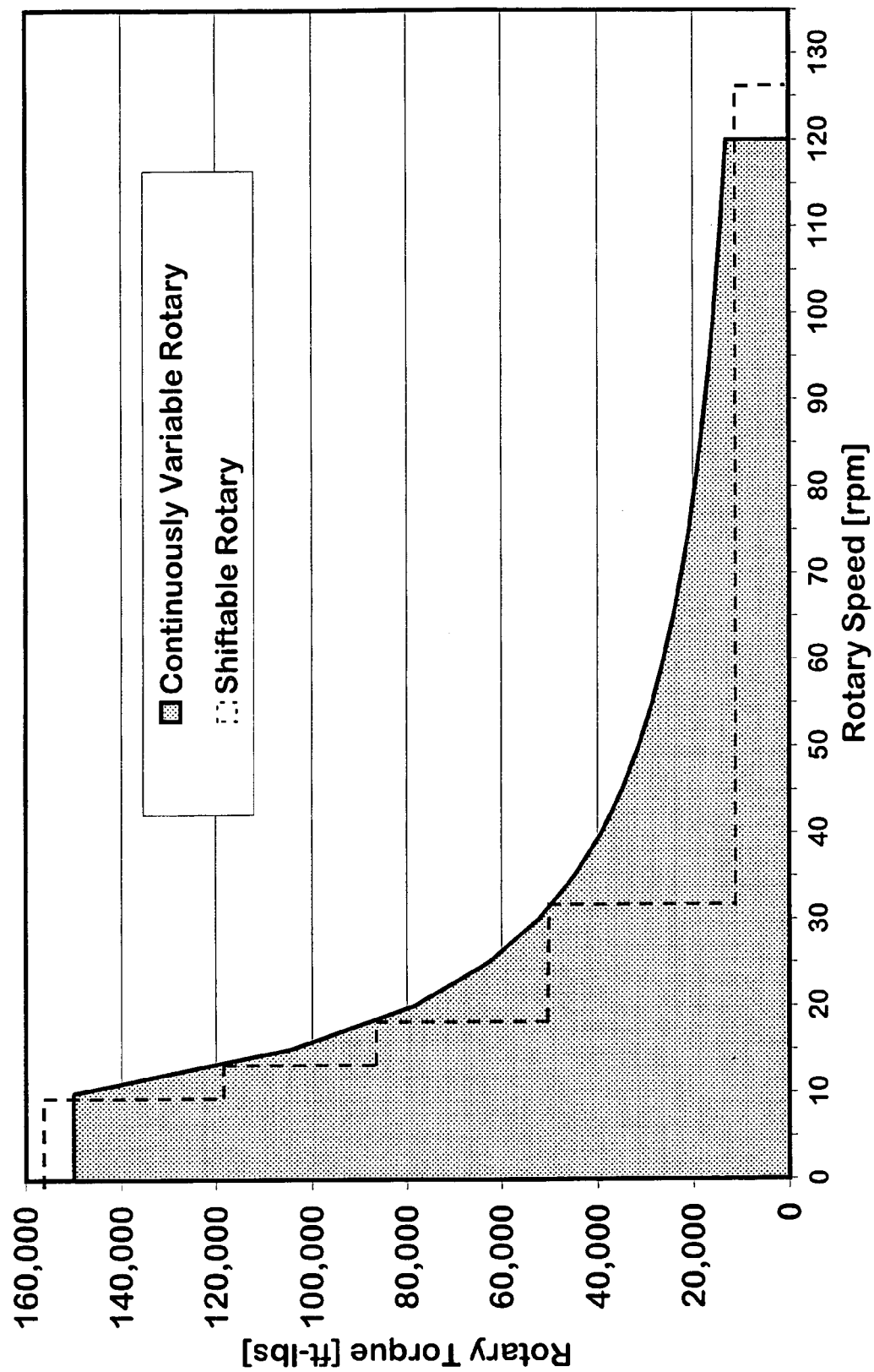
FIG. 5 is a graph showing the relationship between torque and speed with conventional rotary drives and also the rotary drive of the present invention.

The operation of the rotary drive will now be described. During drilling, the primary drive units 33 are operating, rotating the final drive gear 31 (see FIG. 3). Specifically, the primary motors 35 rotate the first stage sun gears 39, which rotation is reduced in speed and carried through the planetary gearboxes 37 to the final drive pinions 53. The final drive pinions 53 rotate the final drive gear 31, which in turn rotates the kelly and the bit. The housings 43 of the primary unit planetary gearboxes 37 are held stationary by the clutch 71. The secondary unit 61 is not operating, with the exception of the clutch 71. The planetary gearboxes 37 operate as single input reduction planetaries. The motor 35 output torque is amplified within the respective planetary gearbox and applied to the final drive pinions 53. The gear ratio between the pinions and the final drive gear further increases the torque and reduces the speed which is then output from the system. By varying the displacement of the input motors within this drilling mode, a range of operation is achieved from high torque-low speed to mid range torque and speed. In this configuration, for the preferred embodiment, and by way of example only, speeds of about 0–45 revolutions per minute (rpm) and torques of about 35,000–150,000 foot-pounds can be achieved (see FIG. 5). The auger bit 23 is thus rotated at relatively low speeds and at relatively high torques. (In FIG. 5, the prior art drive capability is shown by dashed lines A where stopping and/or shifting of the gearbox is required at some point along the curve, while the capability of the drive of the present invention is shown by solid line B, providing a seamless transition between all speeds.)

When the auger bit becomes loaded with soil and is ready for discharging, the operator lifts the auger bit up out of the hole. The mast 17 is then swung away from the hole (the mast can rotate relative to the tracks 13). The auger bit may continue to rotate or may stop, depending upon the preference of the operator, during the raising and swinging operations. The invention permits the drilling tool to continue rotating however. When the auger bit is positioned over a spoil area, the operator accelerates the auger bit rotation to a relatively high speed. By way of example only, the bit can be rotated at 110–130 rpm (see FIG. 5).

The transition to high speeds is accomplished with the secondary unit 61. The clutch 71 is disengaged and simultaneously therewith the secondary motor 63 begins to rotate the sun gear 65. The secondary motor 63 provides torque and speed; the planetary 61 reduces the speed and amplifies the torque. This rotation is output to the secondary pinion 73, which in turn rotates the housings 43. The primary motors 35 continue to operate normally and with the increasing rotation and added torque of the housings 43 provided by the secondary units, the speed of the final drive pinions 53 increase, while the output power remains the same. The torque speed values at the transition between drilling speeds and discharge speeds are matched to create a seamless transition between the two speed ranges (e.g. 40–120 rpm in the example of FIG. 5). From this mid-range, the primary motors' displacements are reduced synchronously, while the secondary motor's displacement is increased to increase the speed of the final drive pinions 53, to achieve the soil discharge speeds. A controller controls the motors by metering the application of hydraulic fluid to the motors.

By reversing the above, the speed can be reduced when the transition is reached, the secondary motor stops rotating and the clutch engages. This minimizes wear of the clutch jaws because the clutch is not rotating during engagement.

Thus, the gearboxes are differential, with two inputs, namely, the sun gear 39 and the housing 43. The differential nature of the drive units allows an additional input to attain higher speeds, while maintaining constant meshing between all drive components. No disengagement of gears is required.

With the present invention, the bit is rapidly accelerated to the higher speeds. A load can be rotationally accelerated up to high speeds more rapidly by using high torques to initially get the load moving. This is in contrast to the prior art, where the acceleration is slow. The rapid acceleration and seamless transition aids in discharging the spoil from the bit and also reduces the amount of time to clear the bit of spoil. This increases drilling efficiencies.

When the bit is emptied of soil, the operator repositions the bit in the hole and resumes drilling. The bit speed is reduced to the lower drilling range. The auger bit can be slowed down without the need to stop the bit, as is required by the prior art. Thus, when changing from drilling speeds to discharge speeds and vice versa, the bit need not be stopped. The speed change can be accomplished with a continuous rotation of the bit. As a practical matter, this removes the potential for damage caused by stopping and shifting of gears, as with the prior art rotary drive.

The present invention adds a torque/speed range previously unusable in hydraulically actuated rotaries, namely the mid-range (for example, 70–80 rpm). This mid-range is useful for processing fluids in the hole. Some holes, when drilled, have unstable side walls that may cave or collapse. The side walls can be stabilized by introducing drilling fluid into the hole. Newly created spoils from additional drilling are then mixed or processed with the drilling fluid in order to suspend them in the fluid thus removing the requirement of removing the auger from the hole and spinning off. Processing is done by inserting the auger bit in the hole and operating at mid-range under full power while moving the auger bit up and down in the hole. The auger bit is inserted in the hole and operated at the mid-range to process the fluid in the hole; the auger bit is rotated and raised up and down in the hole.

Although the invention has been described with hydraulic motors, other types of input drives, such as electric motors, could be used. Electric motors have the potential to provide wider ranges of speeds.

The foregoing disclosure and showings made in the drawings are merely illustrative of the principles of this invention and are not to be interpreted in a limiting sense.

The invention claimed is:

1. A drilling machine for use in drilled shaft applications primarily used in the foundation industry, comprising:
   a) a kelly having one end that is structured and arranged to couple to a drilling tool;
   b) a rotary drive for the kelly, comprising:
      i) a first motor mounted to a frame;
      ii) a final drive gear rotatably coupled to the kelly;
      iii) a planetary gear set having a sun gear and at least one planet gear, the first motor connected to one of the sun gear or the at least one planet gear, the final drive gear connected to the other of the sun gear or the at least one planet gear;
      iv) the planetary gear set having a ring gear around the at least one planet gear, the ring gear rotatable with respect to the frame;

c) a second motor mounted to the frame, the second motor coupled to the ring gear so as to selectively rotate the ring gear.

2. The drilling machine of claim 1 wherein the first and second motors are hydraulic motors.

3. The drilling machine of claim 1 further comprising a releasable clutch coupled to the ring gear.

4. The drilling machine of claim 1 wherein the planetary gear set is a two-stage planetary gear set.

5. The drilling machine of claim 1 wherein the planetary gear set is a first planetary gear set, further comprising:
   a) a third motor mounted to the frame;
   b) a second planetary gear set having a sun gear and at least one planet gear, the third motor connected to one of the sun gear or the at least one planet gear, the final drive gear connected to the other of the sun gear or the at least one planet gear, the second planetary gear set having a ring gear around the at least one planet gear, the ring gear rotatable within the frame;
   c) the second motor coupled to the ring gear of the second planetary gear set, the ring gear of the first and second planetary gear sets rotating together.

6. The drilling machine of claim 5 further comprising a releasable clutch coupled to the ring gears of the first and second planetary gears.

7. The drilling machine of claim 1 wherein the rotary drive can traverse along at least a portion of a mast.

8. A method of drilling a foundation hole, comprising the steps of:
   a) providing a kelly with a drilling tool at one end of the kelly;
   b) with the drilling tool in contact with the ground, rotating the kelly at a first speed and a first torque, so as to drill the hole;
   c) without stopping the rotation of the kelly, lifting the kelly so as to bring the drilling tool out of contact with the ground and rotating the kelly at a second speed and a second torque, the second speed being greater than the first speed so as to discharge spoil from the drilling tool.

9. The method of claim 8, further comprising the steps of:
   a) rotating the kelly and a drilling tool at a third speed, the third speed being greater than the first speed and less than the second speed;
   b) processing fluids in the foundation hole with the rotating drilling tool.

10. The method of claim 8, wherein the step of rotating the kelly at a second speed and a second torque further comprises the step of changing from the first speed and first torque to the second speed and second torque by changing along a range of speeds and torques, while using full power.

* * * * *